Sept. 30, 1952　　　H. M. STUELAND　　　2,612,280
BUCKET OR SHOVEL CONSTRUCTION FOR LOADERS
Filed Aug. 25, 1949
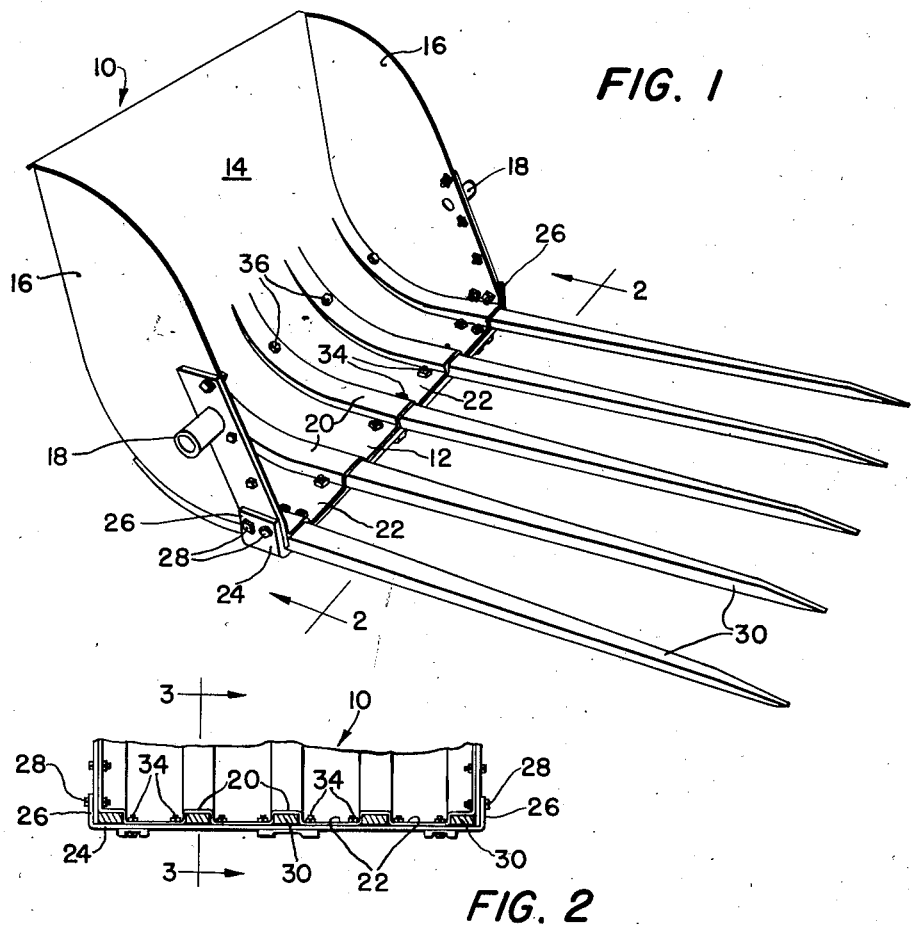
FIG. 1
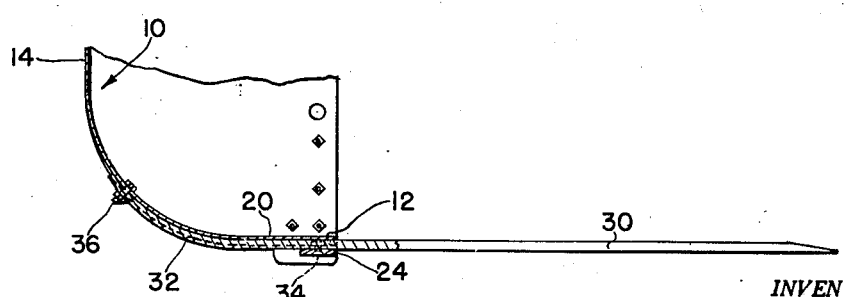
FIG. 2
FIG. 3
INVENTOR.
H. M. STUELAND
BY
ATTORNEYS Patented Sept. 30, 1952

2,612,280

UNITED STATES PATENT OFFICE 2,612,280

BUCKET OR SHOVEL CONSTRUCTION FOR LOADERS

Harold M. Stueland, East Moline, Ill., assignor to Deere & Company, Moline, Ill., a corporation of Illinois Application August 25, 1949, Serial No. 112,348

2 Claims. (Cl. 214—145)

This invention relates to an improved shovel or bucket construction for loaders and diggers.

The preferred embodiment of the invention disclosed herein was designed primarily for use as a shovel on a manure loader and accordingly principles of the invention peculiar to that purpose will be emphasized. However, it will be readily appreciated that the invention may be otherwise applied.

In the conventional manure loader, the shovel or bucket is provided with a plurality of forwardly extending tines which are driven into the pile so that the bucket and tines may be loaded. The bucket itself has a forward or leading edge from which the tines extend. Inasmuch as the tines are subject to rather severe shock loading, it has always been a problem to provide the best means for attaching the tines to the bucket. Obviously, since the tines are often broken, they cannot be made an integral part of the bucket proper. It is known, of course, to provide the leading edge of the bucket as a double lip with the rear portions of the tines inserted therebetween and suitably clamped. However, the lip or double portion of the bucket has a considerable vertical dimension which interferes with efficient digging and loading. It is the principal feature of the present invention to eliminate this double or increased thickness by forming the bucket as a plate having a leading edge generally of corrugated configuration to provide a plurality of transversely spaced, inverted channel portions joined by intermediate plate portions, and to fit or nest the rear portions of the tines, or equivalent extension means, in such channels. A transverse member at the underside of the plate cooperates with the lower or flat undersides of the intermediate plate portions and the plate and this member are secured together intermediate the tines to secure the tines frictionally in place. Another feature of the invention resides in providing additional or separate securing means for securing the rear ends of the tines to the bucket plate. The bucket is preferably arcuate from from front to rear and curves upwardly. The separate or additional securing means are passed through the upwardly curved rear portion of the bucket and comprise individual bolts for the individual tines, the axes of these bolts being so disposed that the plane of rearward shear applied to the bolts through the tines is at an angle to the general plane of the forward portion of the bucket. It has heretofore been known to provide comparable shear bolts as a safety feature to prevent damage to the tines or to the bucket. However, the securing means provided according to the present invention are novel to the extent indicated.

The foregoing and other important objects and desirable features inherent in and encompassed by the invention will become apparent as the disclosure of a preferred embodiment of the invention is fully made in the following detailed description and accompanying sheet of drawings, in which Figure 1 is a perspective view of the bucket or shovel equipped with extension means in the form of tines;

Figure 2 is a transverse sectional view taken substantially on the line 2—2 of Figure 1; and Figure 3 is an enlarged, longitudinal sectional view taken substantially on the line 3—3 of Figure 2.

The bucket proper comprises a plate 10 having a leading or forward edge 12 and a trailing or rear portion 14. The plate is of arcuate shape as viewed from the side and curves rearwardly and upwardly from the leading edge to the trailing portion. In the embodiment illustrated, the bucket has side plates 16, to each of which is secured a trunnion 18 to provide means for mounting the bucket on a suitable support.

The forward portion of the plate 10 is of corrugated construction to provide a plurality of inverted channel portions 20 spaced transversely across the leading edge 12 and extending rearwardly from the leading edge. In a preferred construction, the channels are integral with the remainder of the plate structure. The provision of the channels 20 leaves intermediate plate portions 22 respectively between neighboring channels. The undersides of these intermediate plate portions are flat and lie substantially in the same horizontal plane, as will be readily apparent from an examination of Figure 2. The channels extend rearwardly through a major portion of the rearwardly and upwardly curved extent of the plate and are of decreasing vertical section from front to rear so that rear portions of the channels fair into the rear portion of the plate (see Figures 1 and 3).

Means including a transverse member 24 is positioned below and parallels the leading edge 12 of the plate, underlying the open bottoms of the channels 20 and having its upper surface lying flush against the flat undersides of the intermediate plate portions 22. The member 24 thus provides rectangular openings or pockets spaced transversely across the leading edge 12 of the plate, cooperating with the inverted channel portions 20 for that purpose. The member 24 has its opposite ends bent upwardly at 26 and these end portions are respectively rigidly secured to the side plates 16 by securing means in the form of bolts 28.

The bucket is equipped with extension means here shown as comprising a plurality of forwardly extending tines 30. Each tine has a rear end or finger portion 32 preferably formed integral therewith and curved on the order of the curvature of the plate 10, the rear finger portions of the tines respectively fitting the channels 20. These rear finger portions extend coextensive with the channels substantially through a major portion of the plate structure, from front to rear.

The tines are assembled to the shovel by being inserted from rear to front respectively through the pockets formed by the inverted channels and the transverse member 24. The tines are frictionally and relatively rigidly held in place between the plate 10 and the transverse member 24 by securing means comprising a plurality of pairs of bolts 34, one pair of bolts being located between neighboring channel portions and passing through the respective intermediate portions 22 and, of course, through the plate member 24. The heads of the bolts 34 are preferably flattened and countersunk, a detail that will appear in Figure 3.

As will best appear in Figures 2 and 3, the rear or finger portions 32 of the tines 30 nest or fit respectively within the channel portions 20 and are thus held rigidly against lateral displacement. The nuts on the bolts 34 are drawn up tightly and thus clamp the plate and the member 24 together to fix the position of the tines. The tines are additional secured to the plate by individual securing means, preferably comprising a plurality of shear bolts 36, one for each tine. Each bolt is located adjacent a rear portion of the channel at which point the channel fairs into the main curvature of the plate. In other words, each bolt 36 lies generally on a radius of the curvature of the plate. Thus, the plane of rearward shear applied through the tines and finger portions thereof to the bolts 36 is at an angle to the general horizontal plane of the leading edge of the plate. These bolts are preferably shearable so that they will shear or yield before damage occurs to the tines or to the shovel proper. However, the disposition of the bolts at the angle mentioned enables the use of lighter bolts that will meet the same requirement as bolts disposed on axes normal to the horizontal plane of the leading edge of the plate.

As mentioned above, the channel portions 20 are preferably formed integral with those portions of the plates including the intermediate plate portions 22. However, it will be obvious that the channels could be separately provided or otherwise arranged to achieve strap structure to form the pockets in which the rear portions of the tines are carried. Since the maximum vertical dimension of the leading edge of the plate is at that portion of the plate occupied by the tines, and since the vertical dimension intermediate the tines is at a minimum, the digging efficiency of the structure is considerably improved, particularly over prior shovels in which the leading edge of the plate and a transverse member comparable to the member 24 are spaced apart and ultimately accumulate material to an extent found to interfere markedly with the ability of the shovel to efficiently handle the job.

Fairing of the channel portions into the rearward portion of the plate facilitates manufacture, since the channel portions are sufficiently long to accommodate the tines, and, further, this design increases the self-cleaning characteristic of the shovel.

Other objects and important features of the invention not specifically enumerated above will undoubtedly occur to those versed in the art, as will numerous modifications and alterations in the preferred structure illustrated, all of which may be achieved without departing from the spirit and scope of the invention as defined in the appended claims.

What is claimed is:

1. A bucket or shovel of the character described, comprising: a plate having top and bottom surfaces and a horizontal forward part including a leading edge and extending horizontally rearwardly and then curving upwardly as a rear trailing part so that the top surface blends into a forwardly facing inner surface and so that the bottom surface blends into a rearwardly facing outer surface, the forward part of the plate being formed with a plurality of elongated fore-and-aft extending corrugations raised above the top surface and providing a plurality of inverted channels opening forwardly to and spaced transversely across the leading edge of the plate and also opening downwardly to the plane of the bottom surface of the plate, said corrugations beginning at said leading edge and extending rearwardly throughout the length of the forward part of the plate and extending further into the curved trailing part, said corrugations thinning out in vertical dimension in the zone in which said top surface of the plate blends into said forwardly facing inner surface so that the rear upper portions of the corrugations fair into said forwardly facing inner surface; a separate transverse member at the underside of the forward part of the plate having a flat upper surface abutting the undersurface of the plate between the channels and closing the bottoms of the channels to provide, with the channels, a plurality of forwardly opening, rearwardly extending pockets at the leading edge of the plate; extension means ahead of the plate and having a plurality of rearwardly extending fingers respectively received in the pockets and nested in the channels, each of said fingers being of substantially uniform width and thickness throughout the portion thereof received in the associated channel, and said width and thickness being substantially equal respectively to the vertical and transverse dimensions of the associated channel at the leading edge of the forward part, said fingers extending rearwardly at the bottom surface of the forward part coextensively with the horizontal extent of the bottom surface and being curved upwardly to conform to the curvature of the outwardly facing outer surface of the rear part of the plate; means securing the transverse member to the plate respectively intermediate the corrugations, with the fingers between the member and the plate; and a plurality of connecting elements, one for each finger, securing the fingers directly to the curved rear part of the plate.

2. The invention defined in claim 1, further characterized in that: the connecting elements are shear bolts passed directly through the fingers and the curved part of the plate and lying on axes in a transverse plane that is at an acute angle to the horizontal forward part of the plate; and the fingers are retained between the member and the plate solely by the upper surface of the member and the sides and under parts of the channels and said shear bolts are the sole means for taking rearward thrust applied to the fingers so that upon shearing of a bolt the associated finger may move rearwardly in its channel relative to the plate.

HAROLD M. STUELAND.

REFERENCES CITED

The following references are of record in the file of this patent:

UNITED STATES PATENTS

| Number | Name | Date |
|---|---|---|
| 818,100 | Kormil et al. | Apr. 17, 1906 |
| 967,819 | McKenzie | Aug. 16, 1910 |
| 1,198,592 | Stein | Sept. 19, 1916 |
| 1,217,500 | Rehally | Feb. 27, 1917 |
| 1,757,328 | Mullally | May 6, 1930 |
| 1,807,632 | McKee | June 2, 1931 |
| 1,989,776 | Weimer | Feb. 5, 1935 |